United States Patent [19]
Hoffmeister

[11] 3,937,513
[45] Feb. 10, 1976

[54] DUAL-PURPOSE REMOTE-CONTROL GRAB FOR FUEL ELEMENTS AND CONTROL RODS OF A NUCLEAR REACTOR

[75] Inventor: Bernhard Hoffmeister, Wilhelmshaven, Germany

[73] Assignee: Fried. Krupp Gesellschaft mit beschrankter Haftung, Essen, Germany

[22] Filed: Oct. 29, 1974

[21] Appl. No.: 519,005

[30] Foreign Application Priority Data
Nov. 28, 1973 Germany............................ 2359163

[52] U.S. Cl................ 294/86 A; 176/30; 176/36 R; 294/88
[51] Int. Cl.²......................................... G21C 19/10
[58] Field of Search.... 294/86 R, 86 A, 86.1, 86.13, 294/86.16, 86.26, 86.29, 88, 90, 102 A; 24/249 R, 249 DP, 263 DQ; 176/30, 36 R, 36 C; 214/18 N

[56] References Cited
UNITED STATES PATENTS

| | | | |
|---|---|---|---|
| 3,253,995 | 5/1966 | Antonsen et al............. | 214/18 N X |
| 3,383,286 | 5/1968 | Paget .......................... | 294/86 R X |
| 3,691,011 | 9/1972 | Kruger et al................. | 176/30 |

*Primary Examiner*—Evon C. Blunk
*Assistant Examiner*—Johnny D. Cherry
*Attorney, Agent, or Firm*—Karl F. Ross; Herbert Dubno

[57] ABSTRACT

An apparatus for inserting and removing both control rods and fuel elements from holes in a nuclear reactor has a vertically and horizontally displaceable support pivotally carrying a head which has a pair of grabs on its opposite ends, one of which is formed as a pair of pawls adapted to lock on the collar at the end of a fuel element and lift this element and the other of which is adapted to engage within a group of control rods to unlock them from their respective fuel elements and grip them so that they can be lifted from the respective fuel element. To this end the housing having the two grabs is provided with a small pneumatic cylinder whose piston is displaceable against spring force in one direction and is connected to both of the grabs so that on displacement in this direction it opens both of the grabs, the spring therefore serving to hold these grabs closed should pneumatic pressure fail. The grab head is pivotal on the support about a horizontal axis on pins serving as the pivot for this head and provided with pinions meshing with racks that can be displaced up and down so as to rotate the head through 180°, thereby aligning either of the grabs with a respective object. In addition locking means is provided so as to hold this head in either of these positions, thereby preventing it from tilting and dropping a group of control rods or a fuel element.

12 Claims, 4 Drawing Figures

DUAL-PURPOSE REMOTE-CONTROL GRAB FOR FUEL ELEMENTS AND CONTROL RODS OF A NUCLEAR REACTOR

FIELD OF THE INVENTION

The present invention relates to an apparatus for grabbing and lifting differently shaped elongated objects. More particularly this invention concerns an apparatus for inserting control rods and fuel elements into respective holes in a nuclear reactor and withdrawing them therefrom.

BACKGROUND OF THE INVENTION

In order to change the control rods and fuel elements in a nuclear reactor a device is known having a pair of side-by-side grabs, one adapted to fit and lock onto the top of the fuel element and the other adapted to lock onto the top of a group of control rods. This arrangement allows the adjustment of a reactor by remote control in that this double grab is mounted on the end of a traditional arm operated by remote control with various servo motors.

The principal disadvantage of such a device is that it is extremely expensive. A separate set of controls, actuators, motors, sensors and the like is necessary for each of the grabs; thus the expense if elevated. In addition, such a device is relatively bulky and has a limited service life due to its extreme complexity.

OBJECTS OF THE INVENTION

It is therefore an object of the present invention to provide an improved apparatus for inserting differently shaped elongated objects into and withdrawing same from respective holes.

Another object is the provision of an improved double grab usable both to pick up and to set down control rods and fuel elements in a nuclear reactor.

Another object of this invention is the provision of such a double grab which is relatively simple and inexpensive to manufacture.

A further object is to provide a double grab of the above-described general type which has a long service life.

SUMMARY OF THE INVENTION

These objects are attained according to the present invention in a grab having a head pivotally mounted on a vertically and horizontally displaceable support. This head has a pair of opposite sides on each of which is provided a respective grab, one adapted to engage and lock on the top of a fuel element and the other adapted to engage and lock on the top of a group of control rods. Means is provided for pivoting the head on the support between a pair of positions corresponding to alignment of a respective grab with a respective object. Thus the overall size of the device is reduced considerably, as the operator need merely turn the head of the grab over in order to change its function.

In accordance with yet another object of this invention the pivotal head is provided with a single actuator displaceable against spring force in a single direction and connected to both of the grab means such taht on displacement in this direction against the spring force it opens both of these grabs. This single actuator therefore operates both of the grabs and the overall cost and complexity of the pickup device is considerably lessened.

The operating element of this actuating means is according to the present invention a fluid-operated cylinder whose piston is displaceable in a direction which causes grab formations on the grabs to release the respecitve objects by means of fluid pressure and is urged constantly in the other direction by a spring. Thus any failure of fluid pressure cannot cause the grabs to drop their respective objects, a situation which could be extremely dangerous and costly in a nuclear reactor.

In accordance with yet another feature of this invention the grab head is generally elongated, having one of the grabs on each of its ends, and is pivotal about a horizontal axis perpendicular to the longitudinal axis of the grab head. The grab is provided at its pivot with means for rotating it through 180° so as to be able to bring either of its ends into a downwardly facing position for engagement of the complementary formation thereon with the top of a control rod assembly or a fuel element. This pivoting means comprises in accordance with the present invention a pinion carried on the grab head at the rotation axis thereof and a rack which is in mesh with the pinion and displaceable so as to rotate the head.

According to yet another feature of this invention means is provided for locking the grab head in either of its two positions, that is in the position with one grab facing downwardly and the other upwardly and vice versa. This locking means comprises a locking element engageable with the upper ends of the grab head so as to lock this grab head pivotally. The locking element engages in a pair of slots and is normally urged downwardly toward the grab head into the upwardly directed slots that are provided on each end thereof. Fluid pressure can displace the locking element away from these slots so that once again a failure of fluid pressure will not cause the locking element to release so that the head can wobble and perhaps drop its load. In accordance with features of this invention sensors are provided to detect the position of the operating elements of both the locking mechanism and the actuating mechanism. These sensors give outputs which indicate that the grab head is locked pivotally in place and that the grabs are in the locking or closed positions.

The pickup assembly according to the present invention is relatively compact and has a very simple mechanism. It is operated by remote control with relative ease, as only three controls need be provided; the orienting arrangement which determines which grab is facing downwardly toward the control rods or fuel elements, the pressurization apparatus for the operating member of these grabs, and the pressurization apparatus for the piston operating the locking mechanisms that holds the grab head rigidly in place. Otherwise this entire assembly is mounted on a support constituted by the end of the conventional pickup cat or arm of a nuclear power plant.

BRIEF DESCRIPTION OF THE DRAWING

The above and other objects, features, and advantages will become more readily apparent from the following, reference being made to the accompanying drawing in which.

SPECIFIC DESCRIPTION

Figure 4:
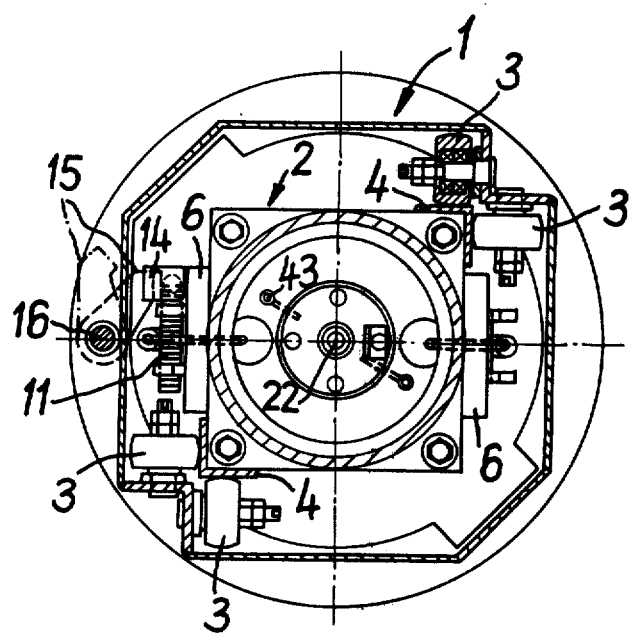
FIG. 4 is a section taken along line IV — IV of FIG. 1.

A vertical support tube 1 is horizontally displaceable by remote control over the entire control-rod and fuel-element area of a nuclear reactor. A vertically displaceable grab head 2 is carried within the tube 1 and guided therein by means of guide rollers 3 (see FIG. 4) which are arranged within the tube 1 in pairs so as to ride on opposite angles rails 4 carried on the corners of the square-section head 2. Secured to the square-section lower end 5 of the head 4 is a pair of flat brackets 6 which extend down parallel to each other and are each formed at their lower ends with bores in which are received bushings 7 defining a horizontal axis 8.

Hollow pivot pins 9 carried on a housing or support head 10 are journaled in the bushings 7 and the center of gravity of the head 10 and the mechanism therein which will be described below lies substantially on this axis 8 for easy pivoting of this head 10 about the axis 8.

Each of the pins 9 is provided with a respective pinion 11 meshing with a respective rack 12 vertically guided on a respective bracket 6 by means of a respective guide tube 13. Each of the racks 12 carries a respective fork 14 in which can engage a respective arm 15 carried on the lower end of a respective rod 16. These rods 16 are guided by eyes 17 on support tube 1 and can both be vertically displaced within these eyes 17 and rotated about their own axes. It should be clear that vertical displacement of the rods 16 with their arms 15 engaged in forks 14 will vertically displace the racks 12 and thereby rotate the housing 10 about axis 8 by means of the pinions 11.

The housing 10 is of generally square cross section and is provided on its one end with four like fingers 18 each lying along one side of the housing 10 and on its other end with four similar such fingers 19. The fingers 18 and 19 are all formed with respective central slots 20 of generally square shape but formed at their outer ends with outwardly diverging surfaces 21. The structure described hitherto is all centered on or symmetrical about a vertical central axis 22 of the apparatus.

The head or housing 10 is centrally formed with a chamber in which is axially reciprocal a piston 23 provided on one side with a piston rod 24 and on the other side with a piston rod 25. A yoke 26 in the form of a metal plate is secured to the one piston rod 24 and tension springs 27 serve to pull this yoke toward the piston, thereby displacing the piston 23 into the upper position shown in FIG. 1. Two pairs of gripper pawls 28 are provided in the lower part of hollow housing 10, pivoted in pairs on two parallel rods 29 lying in a plane orthogonal to the axis 22 and parallel to the axis 8. Two pairs of links 30 pivoted at 31 on the yoke 26 and on respective pawls 28 below the pivots 29 thereof serve to operate these pawls. Thus as the piston is moved downwardly (see FIG. 2) the pawls will be displaced apart, whereas when moved upwardly into the normal rest position these pawls will be drawn together at their lower ends. The lower foot-like ends of the pawls 28 are engageable in holes 32 formed in a collar 33 of a fuel-element head 34. This collar 33 is of square section and is provided with upstanding fingers 35 adapted to engage within the fingers 19 of the housing 10 until the upper ends of the fingers 35 rest against a shoulder 36 formed within these fingers 19. Thus the housing 10 can be brought down and mated with the head 33, with the pawls 28 locking into the openings 32 and rigidly securing the housing 10 to the fuel element.

Means is provided to prevent the head or housing 10 from tipping. This means comprises a transverse locking element 37 having pin-like ends 38 received in respective axially elongated and diagonally opposite slots 39 formed in the brackets 6. The piston rod 40 of a piston 41 slidable in a chamber within the support 5 is urged downwardly by a spring 42 so as to press wedge-like surfaces 44 (See FIG. 2) into the upper diverging ends of the slots 20, thereby locking the entire housing tightly against displacement about its axis 8. A line 43 is provided for feeding air under the piston 41 so as to lift the locking element 37 and allow pivoting of the housing 10.

Figure 1:
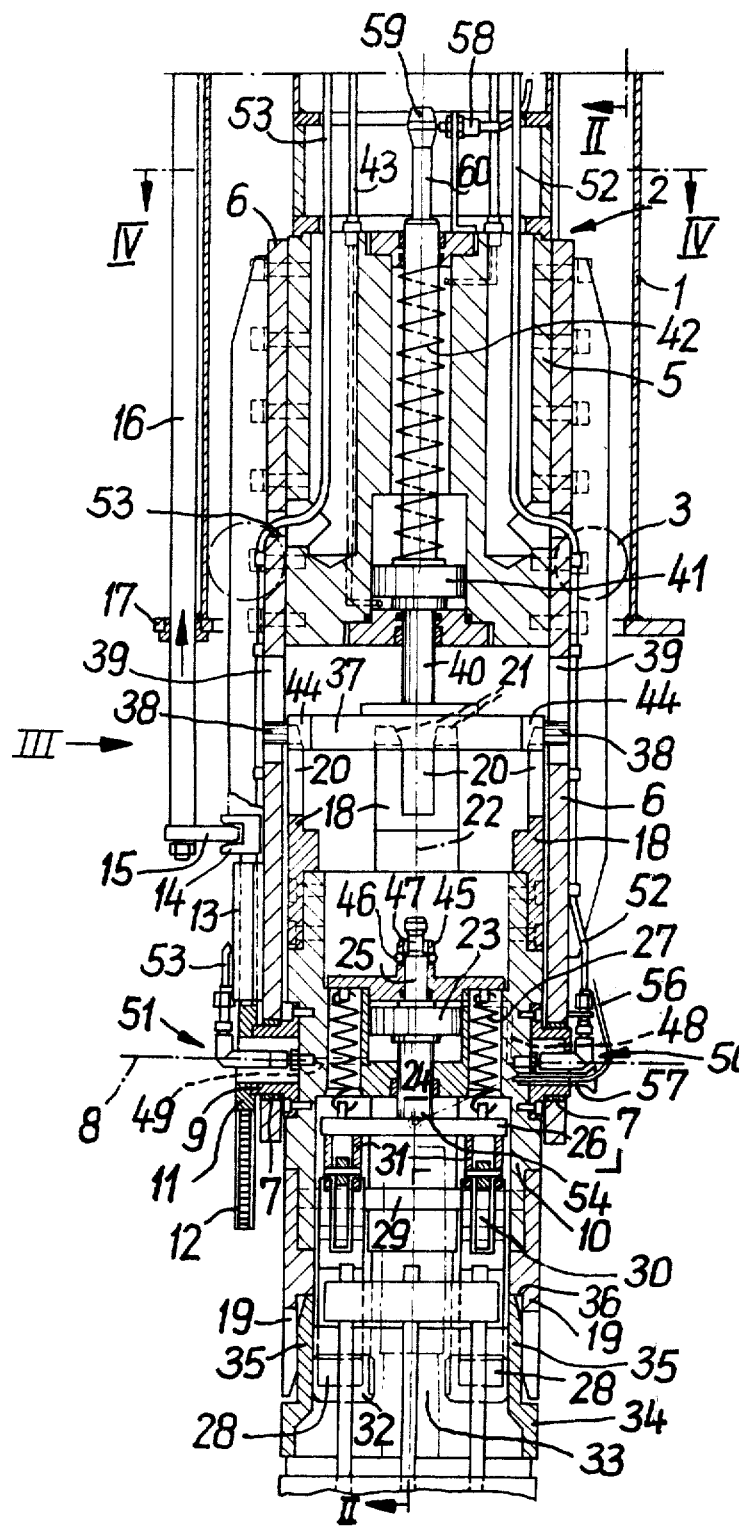
FIG. 1 is a vertical longitudinal section through the apparatus according to the present invention.

In addition the housing 10 is formed with an axially centered cylindrical sleeve 45 in which is slidable the piston rod 25 which is formed with an outwardly open groove 47 alignable with a group of balls 46 or a split ring which projects beyond the outer surface of the sleeve 45 when the piston is in the position illustrated in FIG. 1, but which lie within the projection of the outer surface of the sleeve 45 when the piston is lowered and these balls 46 can engage within the groove 47.

Air is fed to the compartment above piston 23 through a conduit 48 and to the compartment below through a conduit 49. Respective swivel joints 50 and 51 are connected to respective feed lines 52 and 53 extending up through the housing tube 1 to the remote-control station. A position detector 54 having an end 55 engageable with the edge of the yoke 26 is connected via a signal line 56 to a protecting sleeve 57 mounted slightly off-center in one of the pins 9 so that this signal line 56 forms a slight loop at the axis 8. Again this line 56 leads off to the remote-control station so that the operator can be sure that the pawls 28 are in proper position. Similarly the piston 41 is provided as shown in FIG. 1 with an upwardly extending piston rod 60 surrounded by the spring 42 and provided at its upper end with a sensor body 59 engageable in the lower position of the piston 41 with a sensor switch 58 again connected to the remote-control station so that the operator there can determine that the housing 10 is locked in place.

Figure 2:
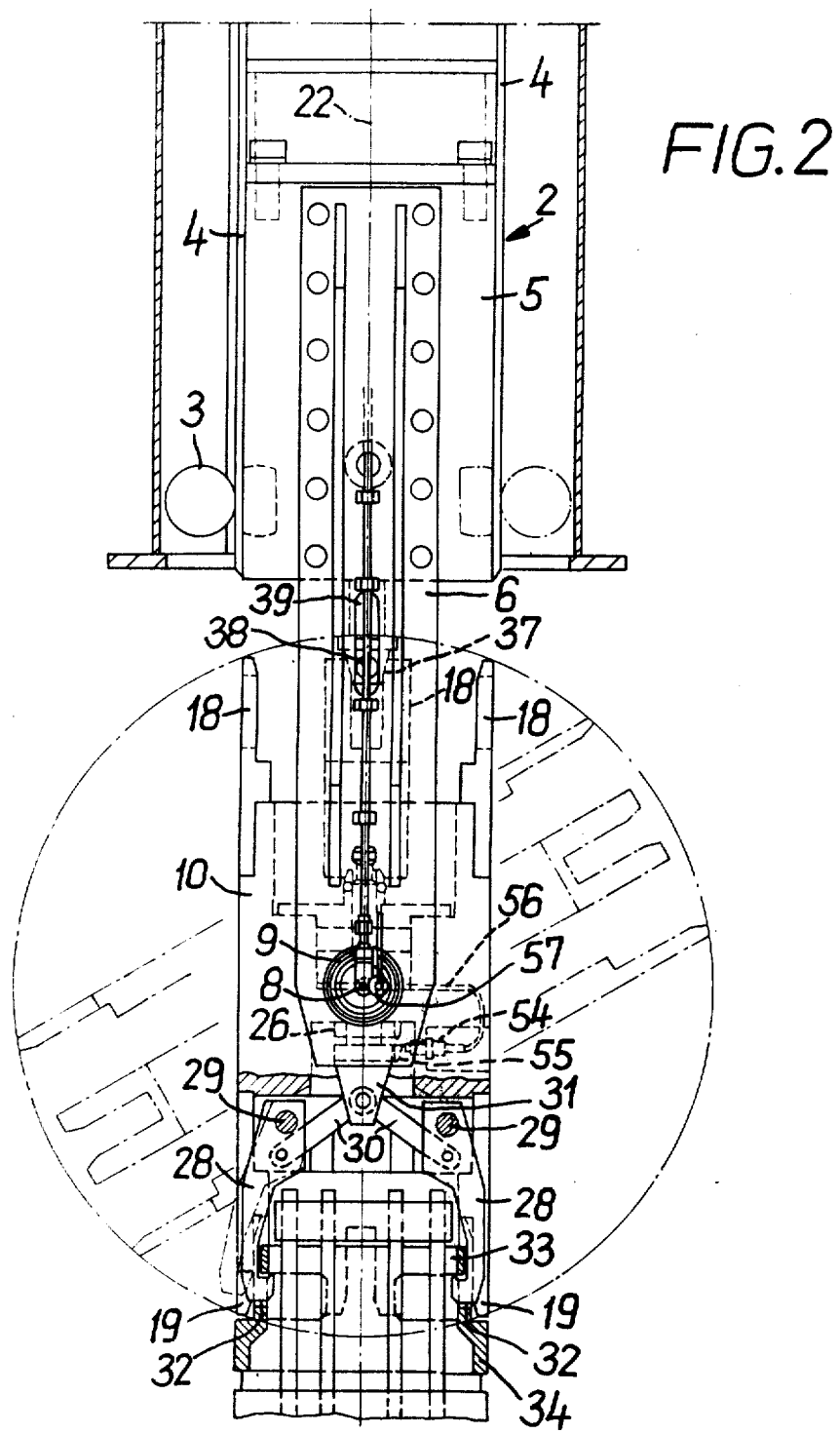
FIG. 2 is a section taken along line II — II of FIG. 1.

FIGS. 1 and 2 show the gripper arrangement in that position in which it is used to draw a fuel element out of its respective hole or place such a fuel element in a hole. To this end the tool with its housing 10 has been rotated by the racks 12 and the pinions 11 into the position of FIG. 1 in which the pawls 28 can grab the fuel-element head 34, with the elongated housing 10 aligned perfectly with the axis 22. In this position the assembly is locked in place by the wedge-like ends of the transverse locking element 37 which are engaged in the slits 20 of two diametrically opposite fingers 18 so that their surfaces 44 lie on the surfaces 41 of these fingers. In this position the air line 43 is not under pressure so that the spring 42 presses the piston 41 down. Similarly the line 52 is not pressurized while the line 53 is so that the force of springs 27 and air pressure below the piston 23 serve to lift the yoke 26 up and draw the lower ends of the pawls 28 together.

The downwardly directed fingers 19 of the tool embrace the upwardly directed fingers 35 of the fuel-element head. The gripper arms 28 are in the locking position in which their hook-like ends fits into the holes 32.

The fuel element is released by pressurizing the line 52 and allowing pressure to bleed out from underneath the piston in line 53. This will press the piston downwardly against the force of springs 27 and spread the ends of the pawls 28 apart so as to release the head of the fuel element.

If it is then desired to withdraw a group of control rods from a fuel element the head must be turned over about the axis 8. To this end the line 43 is pressurized to lift the piston 41 and free locking element 37 from the fingers 19. Then the rods 16 are rotated to bring their arms 15 into engagement with the forks 14 and these rods are lifted so as to rotate the entire assembly through 180°. When the rotation operation is completed the pressure is released from line 43 so as to allow the locking element 37 again to engage between the surfaces of the slots 20 thereby again locking the housing 10 in place. Once the housing is locked in place the operator will see by means of a control lamp connected to the switch 58 that this operation is completed.

Figure 3:
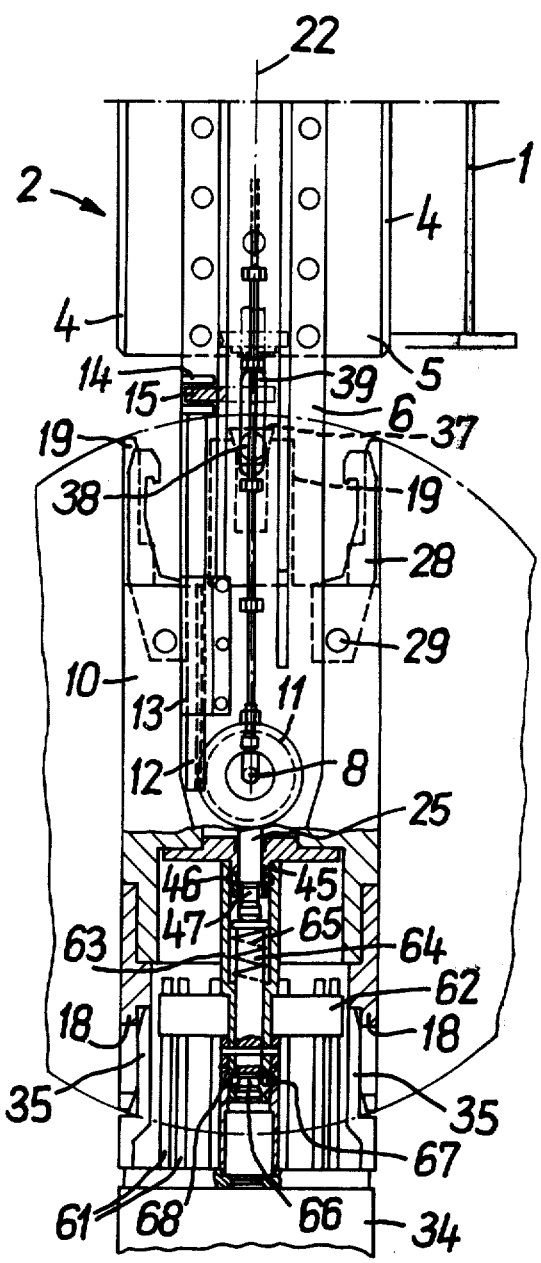
FIG. 3 is an elevational view taken in the direction of arrow III of FIG. 1.

Once again the housing 10 is brought down over the top of a fuel element and engaged over the heads 34 thereof. As shown in FIG. 3 this time however the sleeve 45 is engaged within an upwardly extending collar 63 carried on a plate 62 interconnecting a group of control rods 61. Before the housing 10 is dropped into this position the piston 23 is moved down against the force of springs 27 so that the balls 46 may fall into the groove 47 and allow tight fitting of this sleeve 45 within the sleeve 63 of the control rods. Then the opposite chamber of the piston is pressurized or at least the pressure is relieved so as to allow the springs 27 to pull the piston down and press the balls 46 out into a corresponding groove formed on the inside of the sleeve 63.

At the same time the end of the piston rod 25 depresses a rod 64 urged upwardly in the sleeve 63 by means of a spring 65 and formed at its lower end with an outwardly open groove 66 in which are engageable a group of balls 67 also engageable in an inwardly open groove 68 of the lower extension of the tube 63. When depressed the balls 67 slip into the groove 66 and allow the control rods 61 to be withdrawn from the fuel element by the plate 62 secured to the tube 63.

The assembly according to the present invention allows a single device to be used both to place and withdraw fuel elements and to place and withdraw control rods in a nuclear reactor. The same actuating mechanism (piston 23) is used for gripping both of these different types of objects, and the same locking means (element 37) is used to secure the housing 10 in position no matter which of the grabs 25 or 28 is used. As a matter of fact the direction of displacement of the piston 23 is the same whether it is serving to operate the mechanism or grasping a control rod or that for grasping a fuel element, and the springs 27 serve to urge this piston 23 in the actuating direction so as to prevent a fuel element or a group of control rods from being dropped due to sudden accidental loss of air pressure. Only two sensors are needed to give outputs showing that the entire device is functioning properly and the mechanism is generally so simple that the service life is virtually indefinite.

I claim:

1. An apparatus for inserting differently shaped elongated objects into and withdrawing same from respective holes, said apparatus comprising:
   a vertically displaceable support;
   a head pivotally mounted on said support and having a pair of sides;
   grab means on one side of said head having a formation complementarily shaped for locking on an object of a predetermined shape;
   grab means on the other side of said head having a formation complementarily shaped for locking on an object of another different predetermined shape; and
   means for pivoting said head on said support between two positions each corresponding to alignment of a respective grab means with a respective object.

2. The apparatus defined in claim 1, further comprising actuating means in said head operable for locking said grab means on the respective object.

3. The apparatus defined in claim 2 wherein said actuating means includes a single operating element operatively connected to both of said formations and displaceable in a locking direction for locking said formations on the respective objects and in an opposite releasing direction for disconnecting said formations from the respective objects.

4. The apparatus defined in claim 3 wherein one of said objects is a fuel element used in a nuclear reactor and the other of said objects is at least one control rod used in a nuclear reactor, one of said formations being complementarily shaped to fit such a fuel element and the other being complementarily shaped to fit such a control rod.

5. The apparatus defined in claim 4 wherein said operating element is a piston, said actuating means including means for displacing said piston in said releasing direction with fluid pressure and spring means for urging said piston constantly in said locking position.

6. The apparatus defined in claim 5 wherein said head is elongated and pivotal about a transverse horizontal axis on said support, said grab means being provided on opposite ends of said head.

7. The apparatus defined in claim 6 wherein said acutating means includes a fluid conduit extending from said head along said axis.

8. The apparatus defined in claim 6, further comprising means in said support for locking said head in said two positions relative to said support.

9. The apparatus defined in claim 8 wherein the locking means includes at least one locking element engageable against said ends of said head, an operating member connected to said locking element and displaceable in one direction to press said locking element clampingly against said head and in another direction to bring said locking element out of engagement with said head and allow pivoting thereof, fluid-operated pressure means for displacing said operating member in said one direction, and spring means for continuously urging said locking element in the other direction.

10. The apparatus defined in claim 9, further comprising sensor means for detecting the position of said operating element and having an output line passing out of said head immediately adjacent said axis.

11. The apparatus defined in claim 6 wherein said head is provided with pins lying on said axis and journaled in said support, said means for pivoting including a pinion mounted on at least one of said pins and a rack slidable on said support and meshing with said pinion.

12. The apparatus defined in claim 6 wherein one of said grab means includes a plurality of pawls pivoted on said head and having links connected to said piston for outward displacement of said pawls on displacement of said piston in said releasing direction.

* * * * *